United States Patent
Ogata et al.

(10) Patent No.: US 9,715,633 B2
(45) Date of Patent: Jul. 25, 2017

(54) VEHICLE-MOUNTED IMAGE PROCESSING DEVICE

(71) Applicant: Clarion Co., Ltd., Saitama-shi, Saitama (JP)

(72) Inventors: Takehito Ogata, Tokyo (JP); Masahiro Kiyohara, Tokyo (JP); Satoshi Suzuki, Saitama (JP); Shoji Muramatsu, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/647,398

(22) PCT Filed: Nov. 27, 2013

(86) PCT No.: PCT/JP2013/081898
§ 371 (c)(1),
(2) Date: May 26, 2015

(87) PCT Pub. No.: WO2014/084256
PCT Pub. Date: Jun. 5, 2014

(65) Prior Publication Data
US 2015/0310285 A1   Oct. 29, 2015

(30) Foreign Application Priority Data
Nov. 27, 2012   (JP) .................. 2012-258984

(51) Int. Cl.
*G06K 9/00* (2006.01)
*B60R 1/00* (2006.01)
(Continued)

(52) U.S. Cl.
CPC ............ *G06K 9/00812* (2013.01); *B60R 1/00* (2013.01); *G06K 9/00362* (2013.01);
(Continued)

(58) Field of Classification Search
None
See application file for complete search history.

(56) References Cited

U.S. PATENT DOCUMENTS 5,961,571 A * 10/1999 Gorr .................. G01S 3/783
340/988
6,734,896 B2 * 5/2004 Nobori .................. B60R 1/00
348/148
(Continued)

FOREIGN PATENT DOCUMENTS

CN   104464375 A *   3/2015
DE   EP 1690777 A1 *   8/2006  ........... B62D 15/027
(Continued)

OTHER PUBLICATIONS

International Search Report (PCT/ISA/210) dated Dec. 24, 2013 with English-language translation (four (4) pages).
(Continued)

*Primary Examiner* — Tsung-Yin Tsai
(74) *Attorney, Agent, or Firm* — Crowell & Moring LLP

(57) ABSTRACT

Provided is a vehicle-mounted image processing device capable of recognizing the outside of a vehicle based on an image taken by a vehicle-mounted camera more precisely. A vehicle-mounted image processing device of the present invention includes: an image acquisition unit (12) that acquires through-images (21) to (24) taken by cameras (1) to (4) disposed on front, rear and sides of a vehicle (10); a bird's eye view image generation unit (13) that converts the acquired through images (21) to (24) to generate a bird's eye view image (25); a parking line recognition unit (15) that performs parking line recognition processing to recognize a parking line WL based on at least one of the through-images (21) to (24) and the bird's eye view image (25). The parking line recognition unit (15) performs first parking line recognition processing (S111) based on the bird's eye view image
(Continued)

| | | CPU use allocation | |
|---|---|---|---|
| Vehicle-speed conditions | First image processing circuit | Second image processing circuit |
| vsp ≤ th_vlow | Pedestrian detection 100% | Parking line recognition 100% |
| vsp > th_vlow | Parking line recognition 50% | Parking line recognition 50% |
| | 50% available | 50% available |

(25) to recognize a parking line WL in a predetermined range of the bird's eye view image (25), and second parking line recognition processing (S112) based on the through-images (21) to (24) to recognize a parking line WL in an area that is far away from the predetermined range of the bird's eye view image (25).

7 Claims, 21 Drawing Sheets

(51) Int. Cl.
  *G08G 1/16* (2006.01)
  *H04N 7/18* (2006.01)
(52) U.S. Cl.
  CPC ......... *G06K 9/00805* (2013.01); *G08G 1/166* (2013.01); *G08G 1/167* (2013.01); *G08G 1/168* (2013.01); *H04N 7/18* (2013.01)

(56) References Cited

U.S. PATENT DOCUMENTS

| | | | | |
|---|---|---|---|---|
| 7,640,107 | B2* | 12/2009 | Shimizu | B60K 35/00 340/932.2 |
| 7,659,835 | B2* | 2/2010 | Jung | B62D 15/0285 340/932.2 |
| 8,044,789 | B2* | 10/2011 | Daura Luna | B60Q 9/008 340/425.5 |
| 8,948,990 | B2* | 2/2015 | Kobayashi | B62D 15/0285 340/932.2 |
| 8,958,986 | B2* | 2/2015 | Kagawa | B62D 15/0275 180/199 |
| 2002/0196340 | A1* | 12/2002 | Kato | B60R 1/00 348/148 |
| 2003/0165255 | A1* | 9/2003 | Yanagawa | B60R 1/00 382/104 |
| 2007/0225913 | A1* | 9/2007 | Ikeda | G06K 9/00798 382/104 |
| 2010/0220190 | A1* | 9/2010 | Hiroshi | B60R 1/00 348/148 |
| 2011/0074957 | A1* | 3/2011 | Kiyohara | G06K 9/342 348/148 |
| 2012/0035846 | A1* | 2/2012 | Sakamoto | B60T 8/17558 701/301 |
| 2012/0162427 | A1* | 6/2012 | Lynam | B60R 1/00 348/148 |
| 2012/0170808 | A1* | 7/2012 | Ogata | B60R 21/0134 382/103 |
| 2012/0300078 | A1* | 11/2012 | Ogata | G08G 1/166 348/148 |
| 2012/0327236 | A1* | 12/2012 | Kiyohara | G06K 9/00369 348/148 |
| 2013/0285804 | A1* | 10/2013 | Huang | G08G 1/16 340/441 |
| 2013/0314503 | A1* | 11/2013 | Nix | G06K 9/00805 348/46 |
| 2015/0302261 | A1* | 10/2015 | Kiyohara | G06K 9/00812 382/104 |
| 2015/0302561 | A1* | 10/2015 | Pekkucuksen | G06T 5/006 382/275 |
| 2015/0334385 | A1* | 11/2015 | Takemura | H04N 17/002 348/175 |

FOREIGN PATENT DOCUMENTS

| | | |
|---|---|---|
| EP | 2 586 674 A1 | 5/2013 |
| JP | 2004-254219 A | 9/2004 |
| JP | 2007-161193 A | 6/2007 |
| JP | 2010-146478 A | 7/2010 |
| JP | 2011-30140 A | 2/2011 |
| JP | 2011-77772 A | 4/2011 |
| WO | WO 2011/162108 A1 | 12/2011 |

OTHER PUBLICATIONS

Japanese-language International Preliminary Report on Patentability (PCT/IPEA/409) dated Jan. 5, 2015 (three (3) pages).

* cited by examiner

FIG. 8
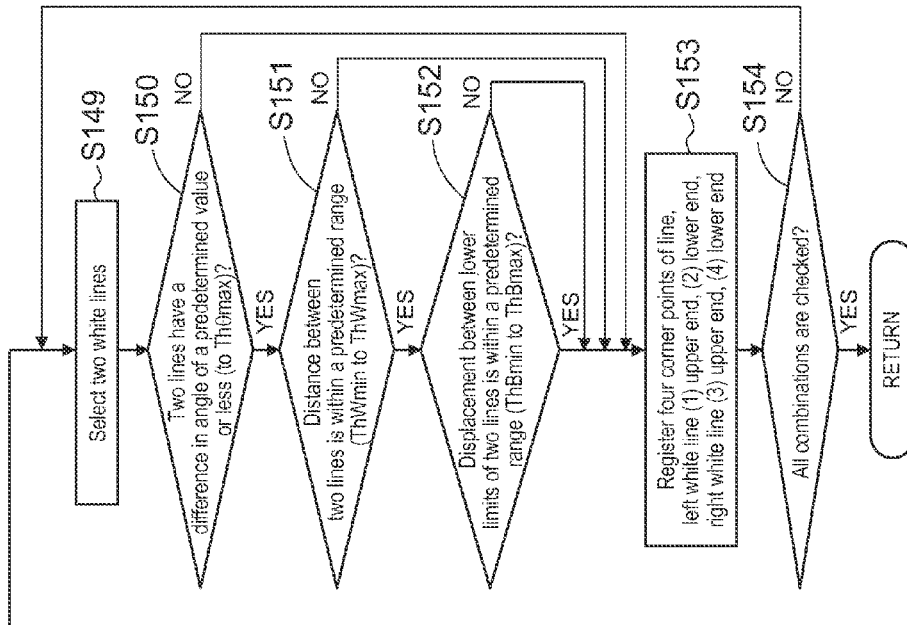
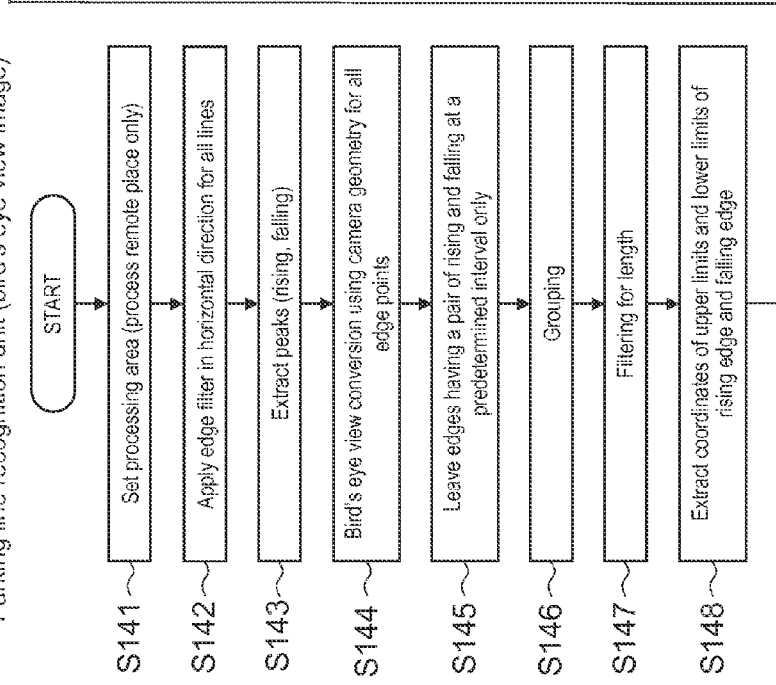

FIG. 19

| Vehicle-speed conditions | CPU use allocation | |
|---|---|---|
| | First image processing circuit | Second image processing circuit |
| vsp ≤ th_vlow | Pedestrian detection 100% | Parking line recognition 100% |
| vsp > th_vlow | Parking line recognition 50% | Parking line recognition 50% |
| | 50% available | 50% available |

FIG. 24

| Vehicle-speed conditions | CPU use allocation | |
|---|---|---|
| | First image processing circuit | Second image processing circuit |
| vsp ≤ th_vlow | Parking line recognition 100% | |
| vsp ≤ th_vhigh | Parking line recognition 100% | 50% available |
| | 50% available | Lane departure recognition 100% |
| vsp > th_vlow | Lane departure recognition 100% | |
| | 50% available | 50% available |

VEHICLE-MOUNTED IMAGE PROCESSING DEVICE

TECHNICAL FIELD

The present invention relates to a vehicle-mounted image processing device that recognizes the outside of a vehicle based on an image taken by a vehicle-mounted camera.

BACKGROUND ART

Patent Literature 1, for example, discloses a technique of taking an image of the surrounding of a vehicle as a whole using each of four cameras mounted on the vehicle on the front, rear, left and right, converting and combining these through-images to create a bird's eye view image, and recognizing a parking line based on the bird's eye view image.

CITATION LIST

Patent Literatures

Patent Literature 1: JP 2011-301140 A
Patent Literature 2: JP 2011-77772 A
Patent Literature 3: JP 2010-146478 A

SUMMARY OF INVENTION

Technical Problem

Typically apparatuses to provide a user with a bird's eye view image provide both of a bird's eye view image and a through-image in the vehicle traveling direction. This is because while a bird's eye view image is suitable for a driver to recognize surroundings of the vehicle, a through-image is more suitable to understand a remote place and a three-dimensional object.

This applies to an apparatus implementing an application to recognize the outside of a vehicle by image processing for driver supporting as well, when an image to be provided to a user is processed so as to reduce the processing load and simplify the configuration of the apparatus. A bird's eye view image of the images to be provided to a user has a narrow viewing field (about 2 m in the front of the vehicle) as compared with a through-image that is not subjected to processing, and so such an image is not suitable to recognize a remote place. For instance, for the purpose of recognizing a parking line in a relatively high vehicle speed at a highway service area, there is a need to recognize a parking line that is far away from the viewing field of a bird's eye view image.

On the other hand, a through-image has a wider viewing field than that of a bird's eye view image, and can recognize a remote place, and so typically image processing is often performed based on a through-image to recognize a lane, for example. Meanwhile a bird's eye view image is easily processed compared with a through-image not subjected to conversion, and for example, it is easier to perform calculation, such as departure prediction from a white line, based on a bird's eye view image. In this way, precision for recognition may be improved in some applications by using a bird's eye view image.

In view of these points, the present invention aims to provide a vehicle-mounted image processing device capable of recognizing the outside of a vehicle based on an image taken by a vehicle-mounted camera more precisely.

Solution to Problem

In order to solve these problems, a vehicle-mounted image processing device of the present invention includes: an image acquisition unit that acquires through-images taken by cameras disposed on front, rear and sides of a vehicle; a bird's eye view image generation unit that converts the acquired through images to generate a bird's eye view image; a parking line recognition unit that performs parking line recognition processing to recognize a parking line based on at least one of the through-images and the bird's eye view image. The parking line recognition unit performs first parking line recognition processing based on the bird's eye view image to recognize a parking line in a predetermined range of the bird's eye view image, and second parking line recognition processing based on the through-images to recognize a parking line in an area that is far away from the predetermined range of the bird's eye view image.

Advantageous Effects of Invention

A vehicle-mounted image processing device of the present invention recognizes a parking line in a predetermined range based on a bird's eye view image, and recognizes a parking line in an area far away from the predetermined range of the bird's eye view image based on a through-image, and so can perform image processing based on an appropriate image depending on the situation and can recognize the parking line more precisely. Problems, configurations, and advantageous effects other than those described above will be made clear by the following description of embodiments.

BRIEF DESCRIPTION OF DRAWINGS

FIG. 8 is a flowchart to describe a method for recognizing of a parking line based on a through-image.

FIG. 19 illustrates an exemplary use allocation rate of a CPU.

FIG. 24 illustrates an exemplary use allocation rate of a CPU.

DESCRIPTION OF EMBODIMENTS

The following describes embodiments of the present invention, with reference to the drawings.

[Embodiment 1]

Figure 1:
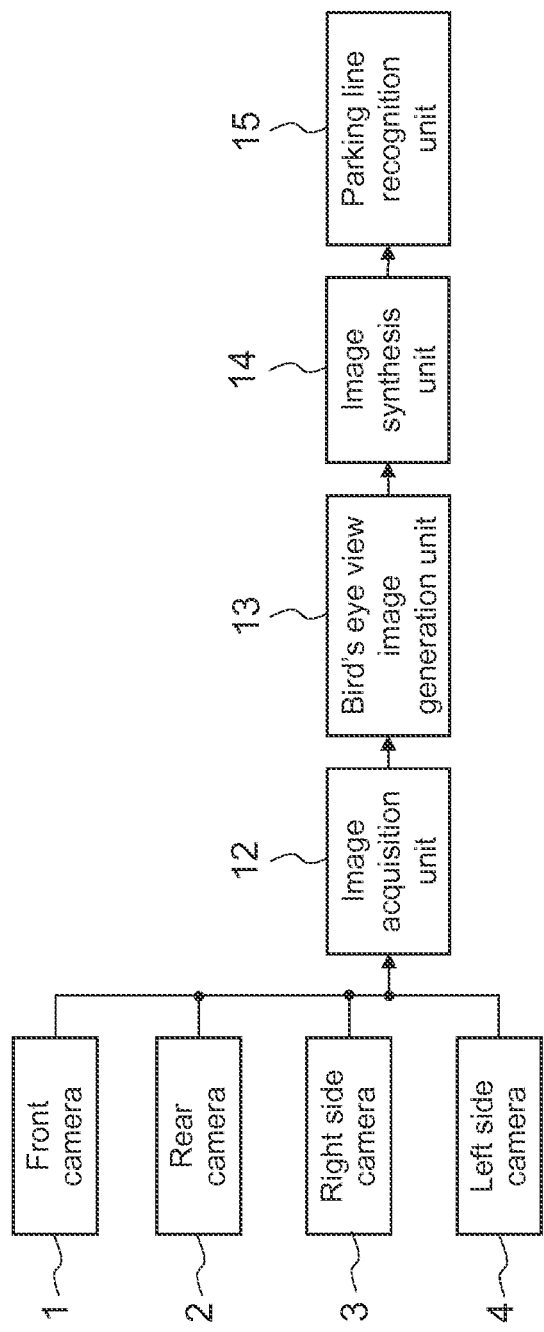
FIG. 1 is a block diagram to describe the configuration of a vehicle-mounted image processing device of Embodiment 1.
Figure 2:
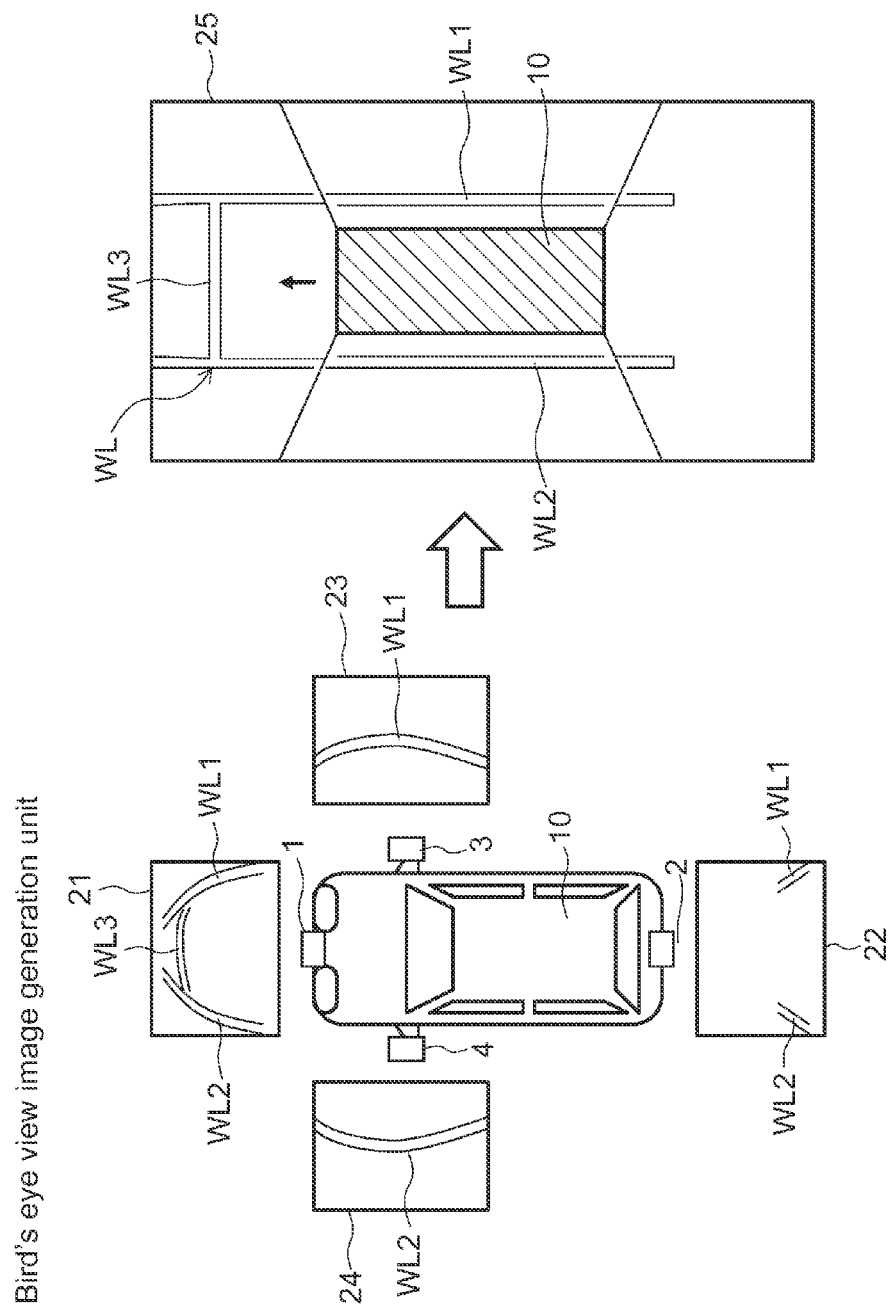
FIG. 2 illustrates an image to describe the configuration of a bird's eye view image generation unit

FIG. 1 is a block diagram to describe the configuration of a vehicle-mounted image processing device of the present embodiment, and FIG. 2 illustrates an image to describe the configuration of a bird's eye view image generation unit.

The vehicle-mounted image processing device is implemented by hardware and software in a camera device mounted on a vehicle 10. The vehicle-mounted image processing device includes an image acquisition unit 12, a bird's eye view image generation unit 13, an image synthesis unit 14, and a parking line recognition unit 15 as its internal functions.

The image acquisition unit 12 acquires through-images taken by a front camera 1, a rear camera 2, a right side camera 3, and a left side camera 4 that are attached on the front, the rear, the right side and the left side, respectively, of the vehicle 10.

The bird's eye view image generation unit 13 converts the through-images acquired by the image acquisition unit 12 to generate a bird's eye view image 25 having a point of view that is shifted to the above of the vehicle 10. The bird's eye view image 25 is generated using a well-known technique. The image synthesis unit 14 synthesizes at least one of the through-images and a bird's eye view image. The parking line recognition unit 15 as an outside recognition unit performs processing to recognize the outside parking line WL from the synthesized image synthesized by the image synthesis unit 14 and based on at least one of the through-images and the bird's eye view image.

In the example of FIG. 2, images of the state where the vehicle 10 enters the parking line WL from the front are taken by the cameras 1 to 4. The parking line WL is defined with marking lines WL1 to WL3 using white or yellow paint for partitioning of the area for one vehicle.

The parking line WL includes marking lines WL1 and WL2 for partitioning of both sides in the vehicle width direction, and a marking line WL3 for partitioning in the vehicle front-rear direction. Each through-image 21 to 24 shows the parking line WL located around the vehicle. Then, the bird's eye view image 25 that is generated by converting the through-images 21 to 24 shows the marking lines WL1 and WL2 and the marking line WL3 on the front side of the vehicle that surround the vehicle 10.

Figure 3:
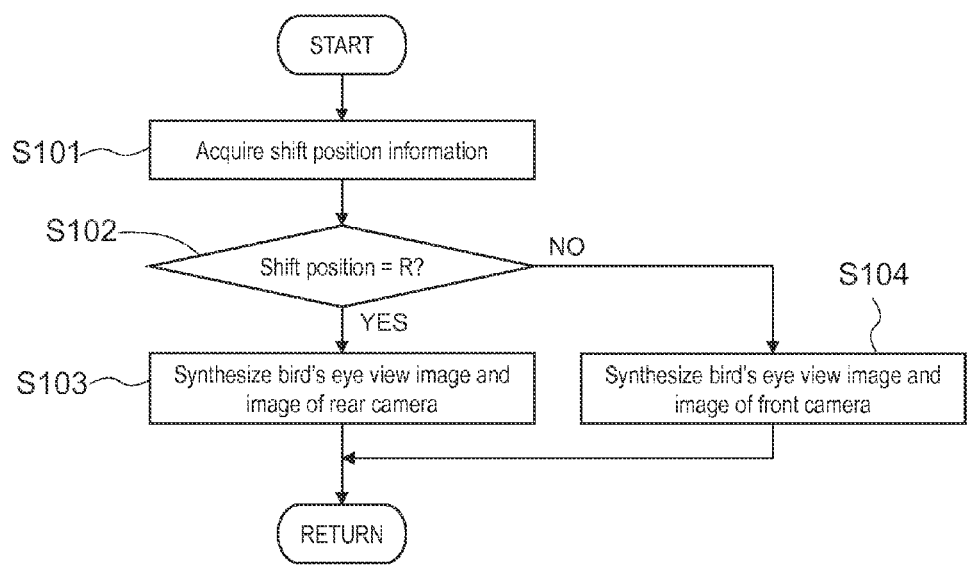
FIG. 3 is a flowchart to describe a method of synthesizing an image for recognition of a parking line.
Figure 4:
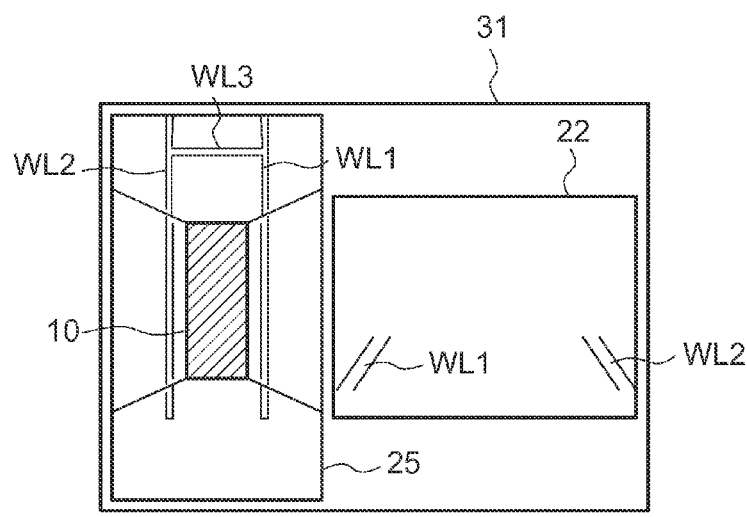
FIG. 4 illustrates an image where a bird's eye view image and a rear camera image are synthesized.
Figure 5:
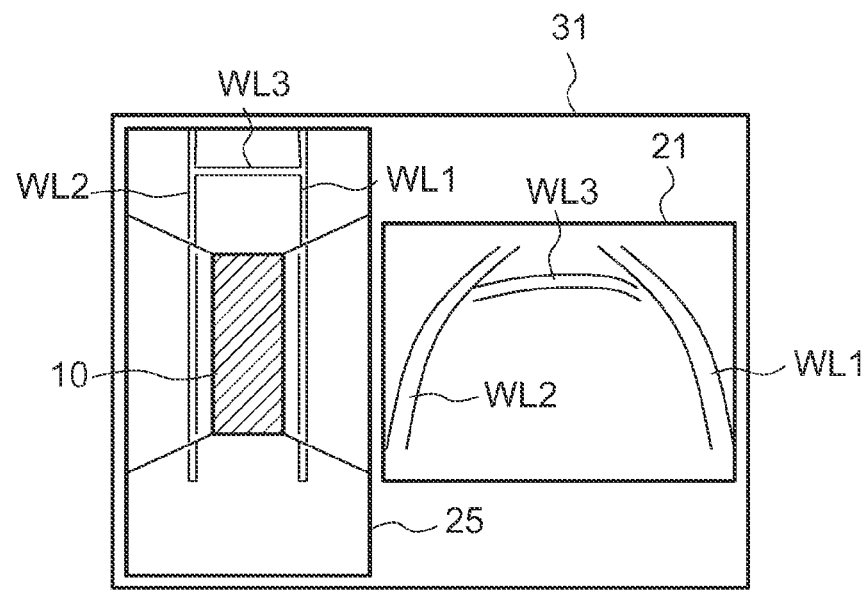
FIG. 5 illustrates an image where a bird's eye view image and a front camera image are synthesized.

FIG. 3 is a flowchart to describe a method of synthesizing an image for recognition of the parking line, FIG. 4 illustrates an image where a bird's eye view image and a rear camera image are synthesized, and FIG. 5 illustrates an image where a bird's eye view image and a front camera image are synthesized.

The image synthesis unit 14 acquires shift position information on the vehicle 10 (Step S101). The shift position information is acquired from a controller to control a driving system of the vehicle 10 via a CAN, for example. The shift position information contains information on the position of a shift of the vehicle 10, for example, in the case of a manual transmission, the position of a shift lever, and in the case of an automatic transmission, the position of a selector lever.

Then, determination is made based on the shift position information whether the position of reverse R is selected or not (Step S102). When the position of reverse R is selected (YES at Step S102), a bird's eye view image 25 and a through-image 22 of the rear camera 2 are synthesized (Step S103). When the position other than reverse R is selected (NO at Step S102), the bird's eye view image 25 and a through-image 21 of the front camera 1 are synthesized (Step S104). Note here that although one through-image and a bird's eye view image are synthesized in this example, a plurality of through-images and a bird's eye view image may be synthesized.

Figure 6:
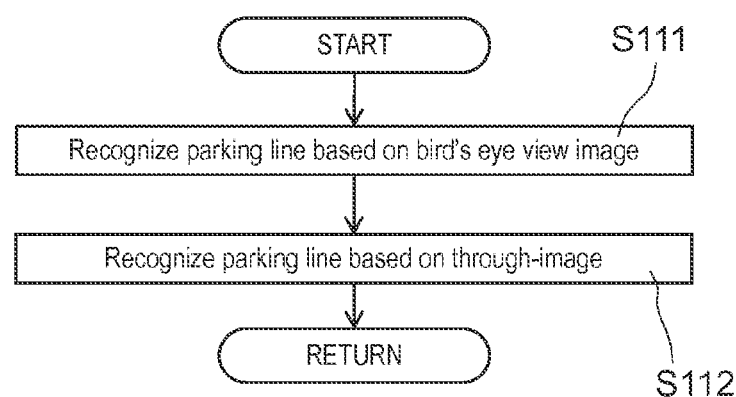
FIG. 6 is a flowchart to describe an exemplary method for recognizing of a parking line.
Figure 7:
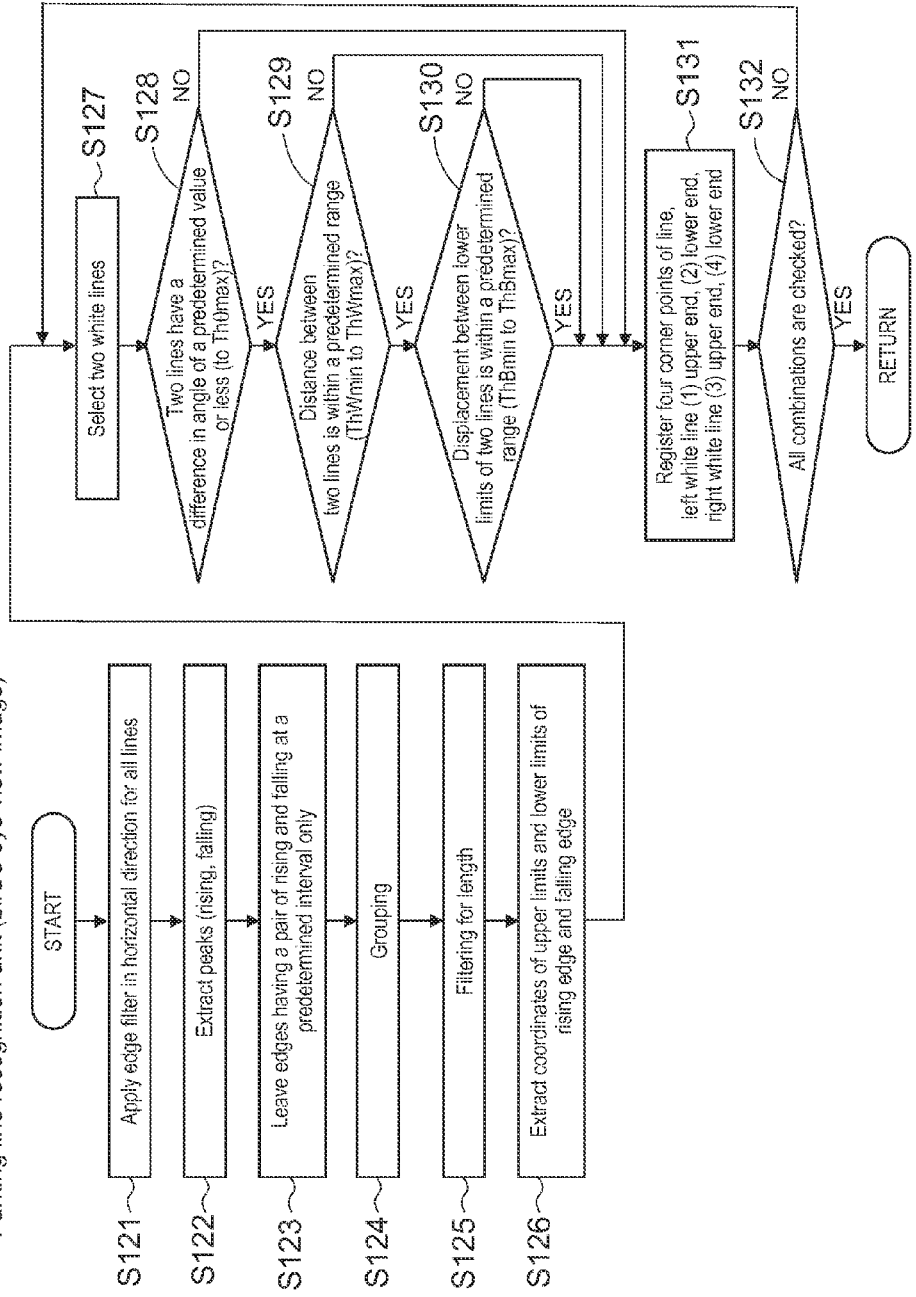
FIG. 7 is a flowchart to describe a method for recognizing of a parking line based on a bird's eye view image.

FIG. 6 is a flowchart to describe an exemplary method for recognizing of the parking line, FIG. 7 is a flowchart to describe a method for recognizing of the parking line based on a bird's eye view image, and FIG. 8 is a flowchart to describe a method for recognizing of the parking line based on a through-image The parking line recognition unit 15 firstly performs first parking line recognition processing to recognize a parking line based on a bird's eye view image 25 (Step S111), and then performs second parking line recognition processing to recognize the parking line based on a through-image (Step S112).

As illustrated in FIG. 7, the first parking line recognition processing firstly applies an edge filter in the horizontal direction for all lines (Step S121) and extracts peaks (rising and falling) (Step S122). Then edges having a pair of rising and falling at a predetermined interval only are left (Step S123), which are grouped (Step S124), and filtering is performed for length (Step S125). Then, coordinates of the upper limits and the lower limits of a rising edge and a falling edge are extracted (Step S126) to select two white lines (marking lines) (Step S127).

Then, determinations are made whether the thus selected two white lines have a difference in angle of a predetermined value or less (to Thθmax) (Step S128), whether the distance between the two white lines is within a predetermined range (from ThWmin to ThWmax) or not (Step S129) and displacement between the lower limits of the two white lines is within a predetermined range (ThBmin to ThBmax) or not (Step S130). Then when all of the conditions at Steps S129 to S130 hold, the procedure shifts to Step S131. At Step S131, coordinate positions of the points of four corners of the parking line WL. i.e., the upper end and the lower end of the white line (marking line WL2) on the left of the vehicle and the upper end and the lower end of the white line (marking line WL1) on the right of the vehicle are registered.

Then determination is made whether all combinations are checked or not (Step S132), and when they are checked (YES at Step S132), the first parking line recognition processing ends. When they are not checked (NO at Step S132), the procedure returns to the processing to select two white lines (Step S127), and the following processing is repeatedly performed until it is determined that all of the combinations are checked (YES at Step S132).

As illustrated in FIG. 8, the second parking line recognition processing firstly sets an image processing area (Step S141). The image processing area is set so as to process an area that is far away from the bird's eye view image 25 only. Then similarly to Steps S121 and S122 in the method for recognizing of a parking line based on a bird's eye view image, an edge filter in the horizontal direction is applied for all lines (Step S142) peaks (rising and falling) are extracted (Step S143). Then bird's eye view conversion is performed using camera geometry for all edge points (Step S144). Then the processing similar to Steps S123 to S132 in the method for recognizing of a parking line based on a bird's eye view image is performed (Steps S145 to S154), and the second parking line recognition processing ends.

The vehicle-mounted image processing device in the present embodiment recognizes a parking line using both of a bird's eye view image and a through-image, and so as compared with the case of using a bird's eye view image only, a parking line can be recognized to a more distant area.

Figure 9:
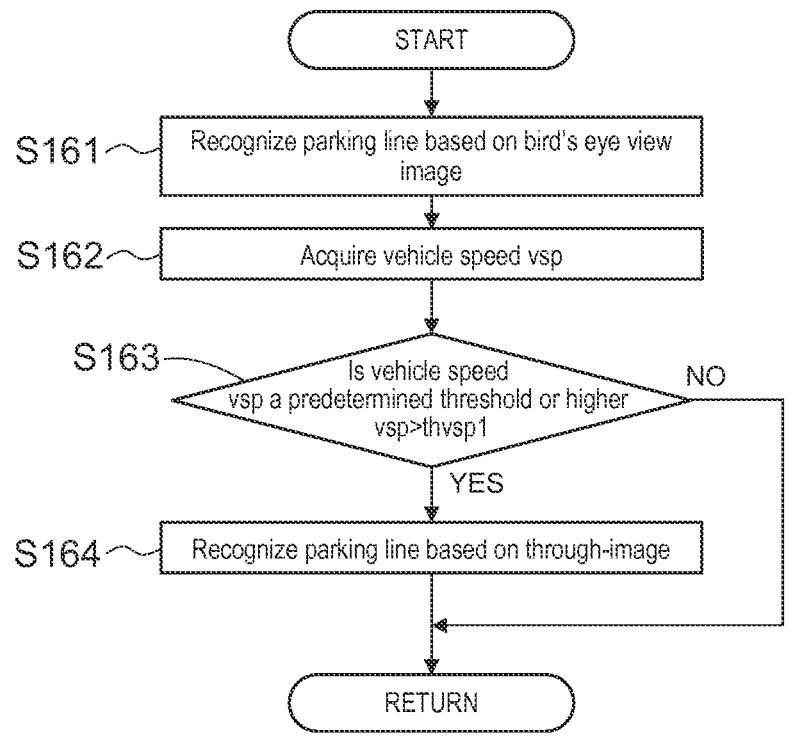
FIG. 9 is a flowchart to describe another exemplary method for recognizing of a parking line.

FIG. 9 is a flowchart to describe another exemplary method for recognizing of the parking line.

In the parking line recognition method as stated above, both of the first parking line recognition processing and the second parking line recognition processing are always performed. Instead, it may be configured so that selection may be made as needed between the case of parking line recognition based on both of the first parking line recognition processing and the second parking line recognition processing and the case where only one of the first parking line recognition processing and the second parking line recognition processing is performed.

As illustrated as modification example 1 in FIG. 9, the parking line recognition unit 15 firstly performs the first parking line recognition processing to recognize a parking line based on a bird's eye view image 25 (Step S161). Then, information on vehicle speed vsp of the vehicle 10 is acquired (Step S162), and determination is made whether the vehicle speed vsp is higher than a predetermined threshold thvsp1 or not (Step S163).

When it is determined that the vehicle speed vsp is higher than the predetermined threshold thvsp1 (YES at Step S163), the second parking line recognition processing is performed based on a through-image, and when the vehicle speed vsp is the threshold thvsp1 or lower (NO at Step S163), the procedure ends.

The configuration example of FIG. 9 performs both of the first parking line recognition processing based on a bird's eye view image and the second parking line recognition processing based on a through-image when the vehicle speed of the vehicle 10 is high, and so can recognize a parking line to a more distant area that is wider than the bird's eye view image. On the other hand, when the vehicle speed is low, the first parking line recognition processing based on a bird's eye view image only is performed, and the second parking line recognition processing based on a through-image is not performed, and so the calculation processing load corresponding to the second parking line recognition processing can be reduced, which can be used for calculation of other applications, for example. In this way hardware resources can be effectively used. The calculation processing load corresponding to the second parking line recognition processing may be used for the first parking line recognition processing based on a bird's eye view image for precise recognition of the parking line.

[Embodiment 2]

Referring next to FIGS. 10 to 13, the following describes Embodiment 2 of the present invention.

Figure 10:
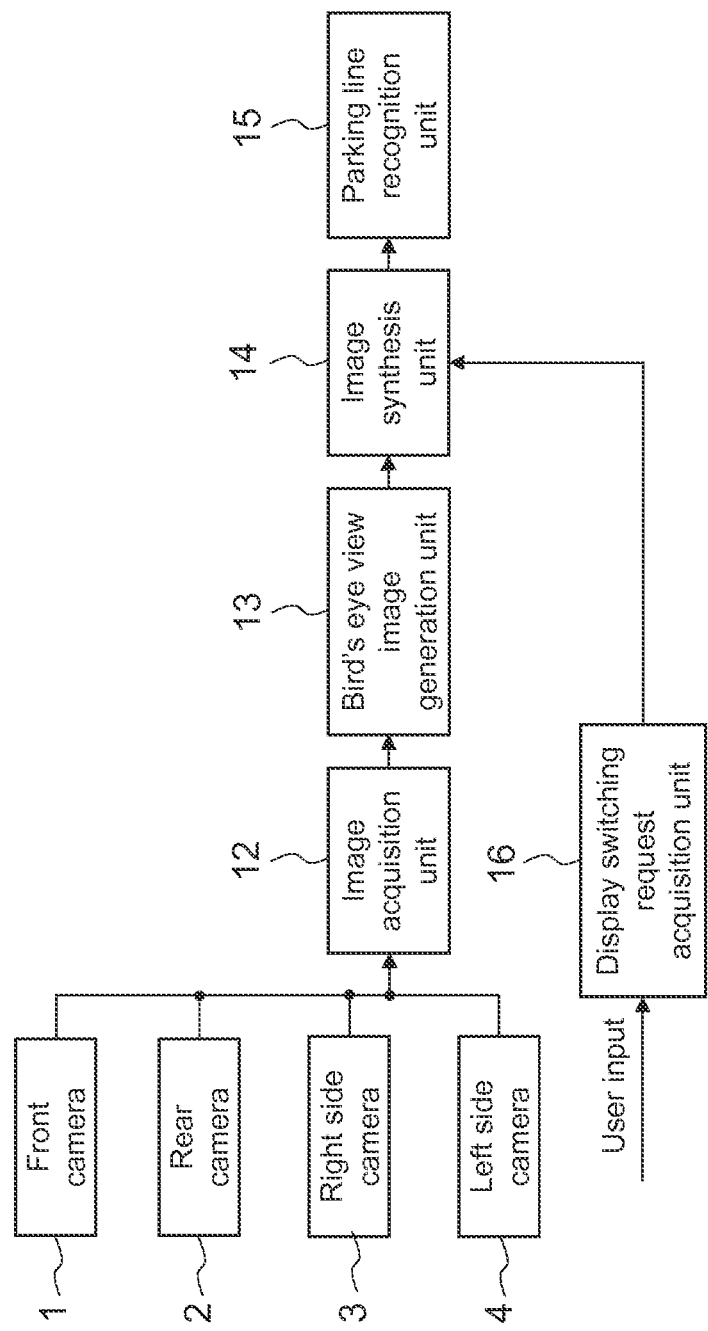
FIG. 10 is a block diagram to describe the configuration of a vehicle-mounted image processing device of Embodiment 2.
Figure 11:
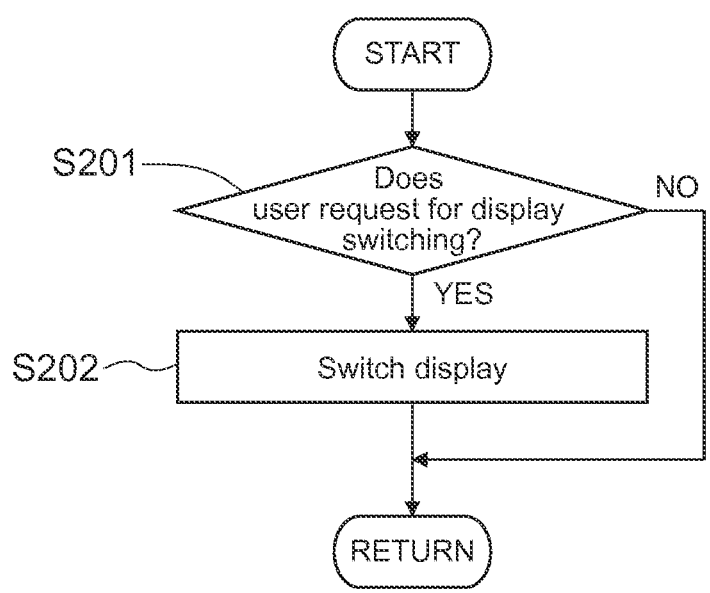
FIG. 11 is a flowchart to describe a switching method of display.
Figure 12:
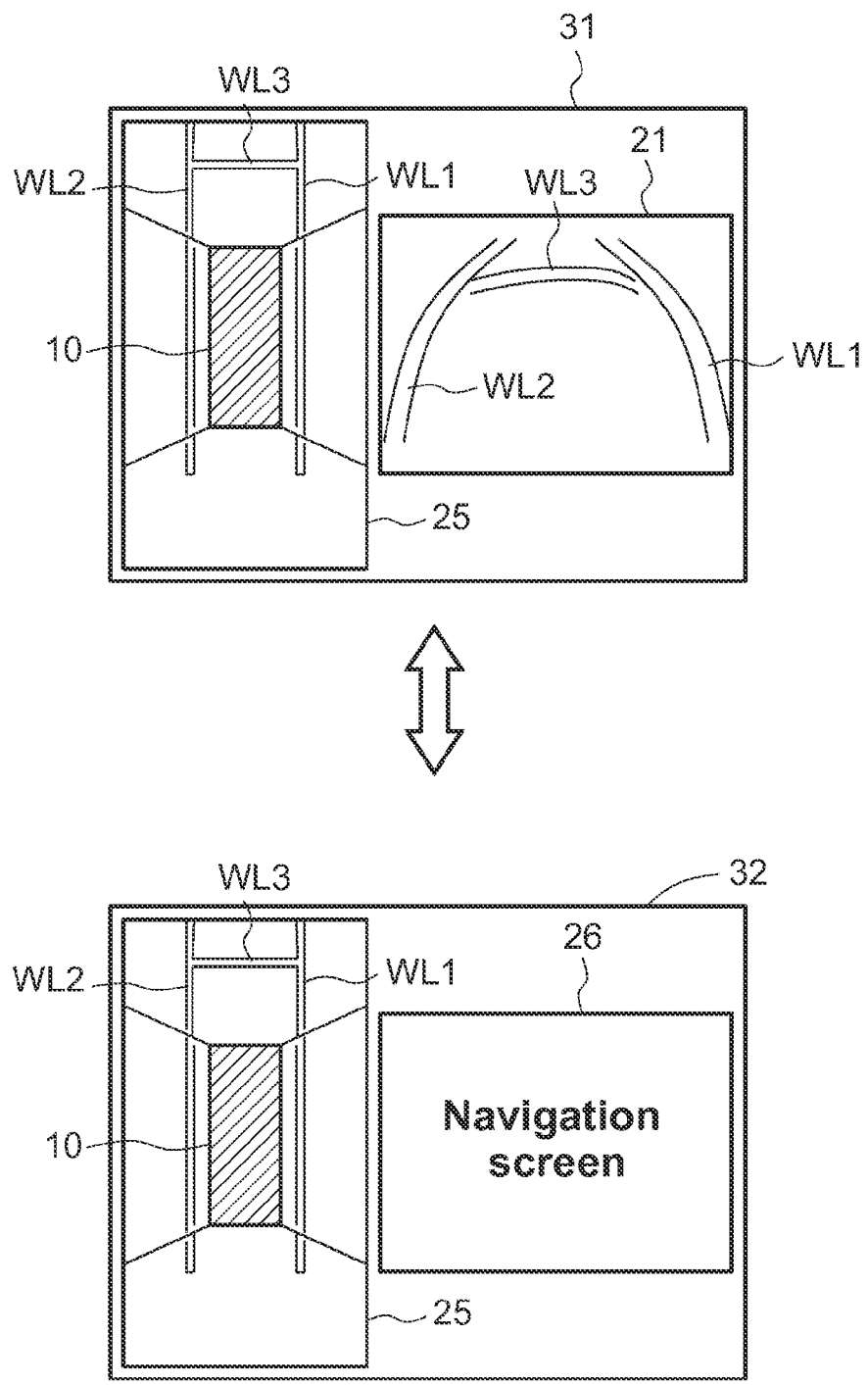
FIG. 12 illustrates an image to describe exemplary switching of the display.

FIG. 10 is a block diagram to describe the configuration of a vehicle-mounted image processing device of Embodiment 2, FIG. 11 is a flowchart to describe a switching method of display, and FIG. 12 illustrates an image to describe exemplary switching of the display. The same reference numerals are assigned to elements similar to those in Embodiment 1, and the detailed descriptions thereon are omitted.

The present embodiment has a feature in that a user is allowed to switch the display of a synthesized image.

As illustrated in FIG. 10, the vehicle-mounted image processing device includes a display switching request acquisition unit 16 to acquire a request for display switching from a user. As illustrated in FIG. 11, the display switching request acquisition unit 16 determines the presence or not of a request for display switching from a user (Step S201), and when a request is present (YES at Step S201), an instruction is issued to the image synthesis unit 14 to switch the display (Step S202), and when no request is present (NO at Step S201), display switching is not instructed.

For instance, as illustrated in FIG. 12, the image synthesis unit 14 synthesizes a bird's eye view image and a through-image to generate a synthesized image 31. Then, when an input for display switching request is received from the display switching request acquisition unit 16 that acquired the display switching request, then the image synthesis unit synthesizes the bird's eye view image and a navigation screen (screen indicating map information and vehicle position information) to generate a synthesized image 32. These synthesized images 31 and 32 are selectively displayed on an in-vehicle monitor (not illustrated). This example describes the case where a bird's eye view image and a navigation screen are displayed as an example of the synthesized image 32, and through-image and a navigation screen may be synthesized.

Figure 13:
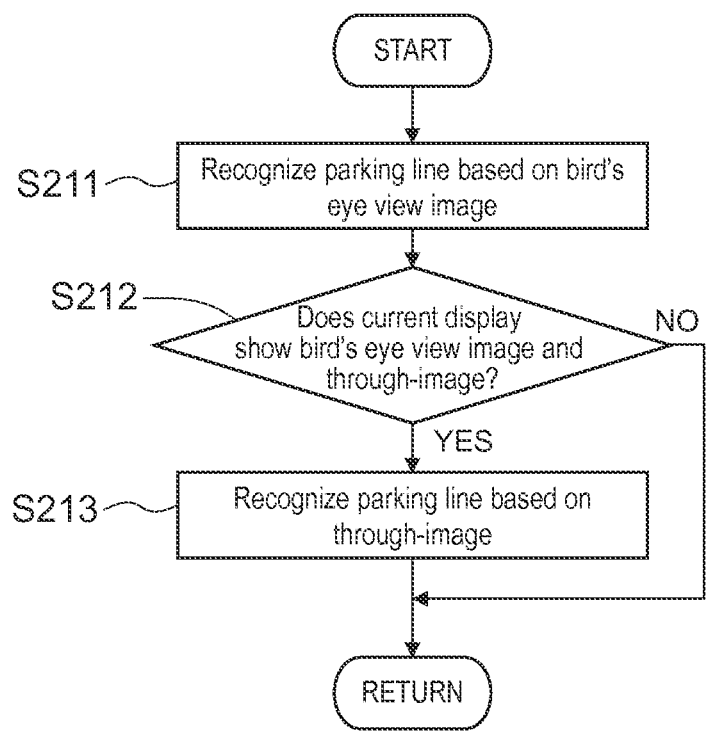
FIG. 13 is a flowchart to describe another exemplary method for recognizing of a parking line.

FIG. 13 is a flowchart to describe another exemplary method for recognizing of the parking line.

When a parking line is recognized based on a bird's eye view image (Step S211), the parking line recognition unit 15 determines whether the current display on the in-vehicle monitor shows a synthesized image of the bird's eye view image and a through-image or not (Step S212). Then when it is determined that the display shows a synthesized image of the bird's eye view image and a through-image (YES at Step S212), the parking line recognition unit recognizes a parking line based on the through-image (Step S213). On the other hand, when it is determined that the current display does not show a synthesized image of the bird's eye view image and a through-image (NO at Step S212), the parking line recognition unit continuously performs recognition of a parking line based on the bird's eye view image.

The present embodiment includes a system allowing a user to select any monitor display image from a plurality of display contents, for example, and a device where an input image of the vehicle-mounted image processing device is the same as the monitor display screen, where a parking line can be recognized in accordance with the state of the display screen.

[Embodiment 3]

Figure 14:
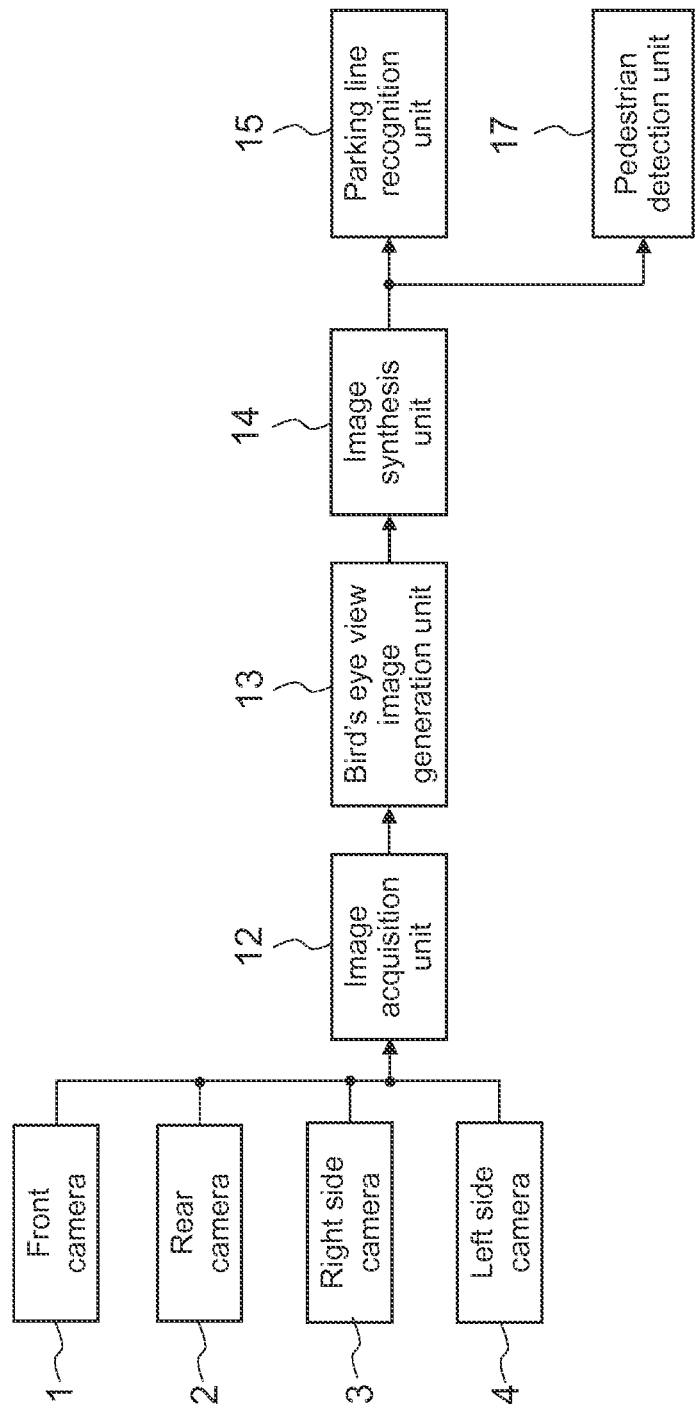
FIG. 14 is a block diagram to describe the configuration of a vehicle-mounted image processing device of Embodiment 3.
Figure 15:
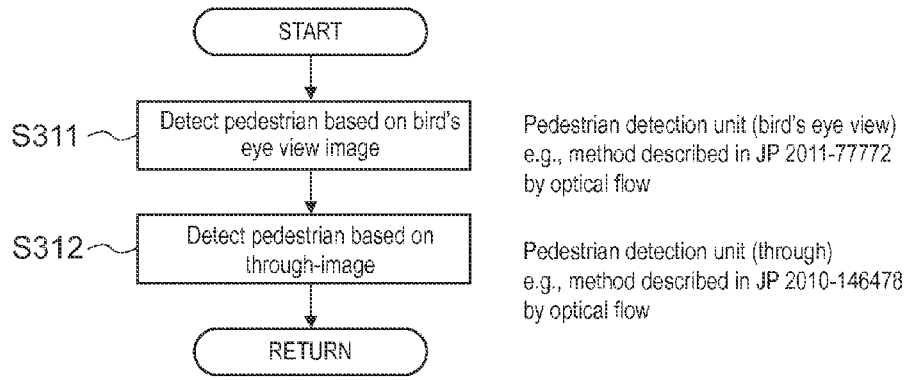
FIG. 15 is a flowchart to describe an exemplary method for detecting of a pedestrian.
Figure 16:
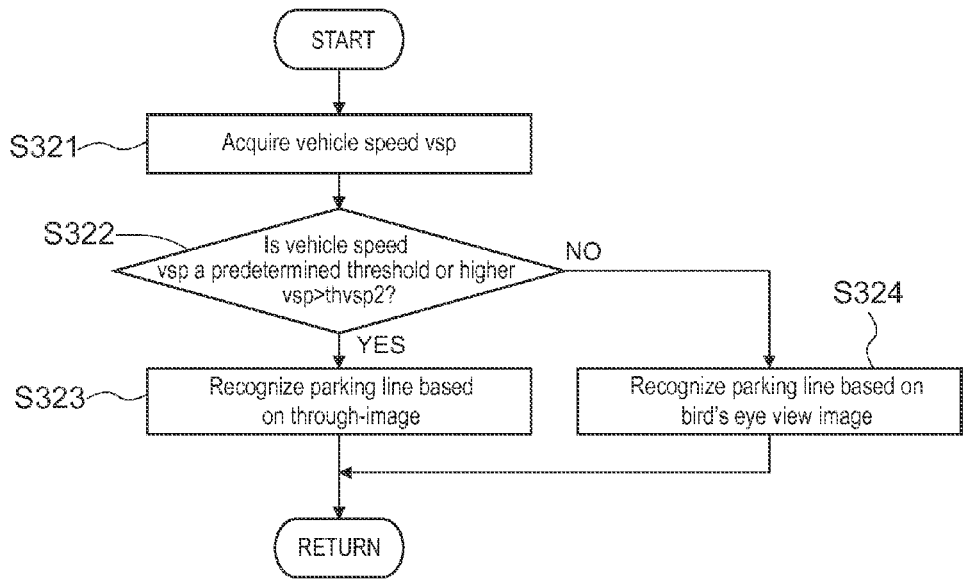
FIG. 16 is a flowchart to describe an exemplary method for detecting of a pedestrian.

Referring next to FIGS. 14 to 16, the following describes Embodiment 3 of the present invention.

FIG. 14 is a block diagram to describe the configuration of a vehicle-mounted image processing device of Embodiment 3, FIG. 15 is a flowchart to describe an exemplary method for detecting of a pedestrian, and FIG. 16 is a flowchart to describe an exemplary method for detecting of a pedestrian. The same reference numerals are assigned to elements similar to those in the above embodiments, and the detailed descriptions thereon are omitted.

The present embodiment has a feature in that, in addition to parking line recognition of Embodiment 1 as stated above, a pedestrian is detected based on a bird's eye view image and a through-image.

As illustrated in FIG. 14, the vehicle-mounted image processing device includes a pedestrian detection unit 17 to detect a pedestrian based on images taken by the vehicle-mounted cameras 1 to 4. As illustrated in FIG. 15, the pedestrian detection unit 17 performs first pedestrian detection processing (Step S311) based on a bird's eye view image, and second pedestrian detection processing (Step S312) based on a through-image.

The first pedestrian detection processing based on a bird's eye view image and the second pedestrian detection processing based on a through-image may be performed using well-known techniques. For instance, the first pedestrian detection processing to detect a pedestrian based on a bird's eye view image may be based on a method using an optical flow described in JP 2011-77772 A (Patent Literature 2), and the second pedestrian detection processing to detect a pedestrian based on a through-image may be based on a method using an optical flow described in JP 2010-146478 A (Patent Literature 3).

FIG. 16 is a flowchart to describe another exemplary method for detecting of a pedestrian.

As illustrated in FIG. 16 as a modification example, the pedestrian detection unit 17 firstly acquires information on vehicle speed vsp (Step S321), and determines whether the vehicle speed vsp exceeds a predetermined threshold thvsp2 or not (Step S322).

When it is determined the vehicle speed vsp exceeds the predetermined threshold thvsp2 (YES at Step S322), the second pedestrian detection processing based on a through-image is performed. When it is determined the vehicle speed vsp is the threshold thvsp2 or less (NO at Step S322), the first pedestrian detection processing based on a bird's eye view image is performed (Step S324).

The configuration example of FIG. 16 performs the second parking line recognition processing based on a through-image only when the vehicle speed of the vehicle 10 is high, and so can detect a pedestrian to a more distant area that is wider than the bird's eye view image.

[Embodiment 4]

Figure 17:
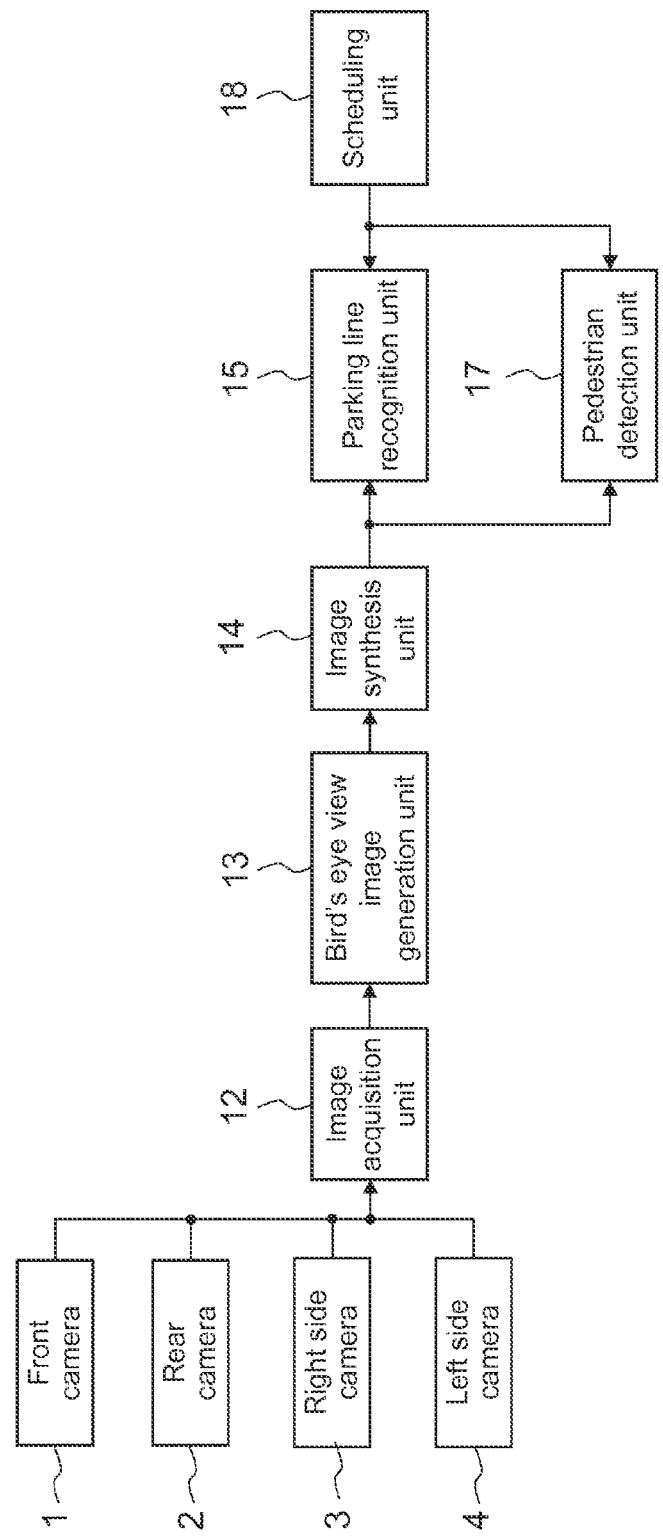
FIG. 17 is a block diagram to describe the configuration of a vehicle-mounted image processing device of Embodiment 4.
Figure 18:
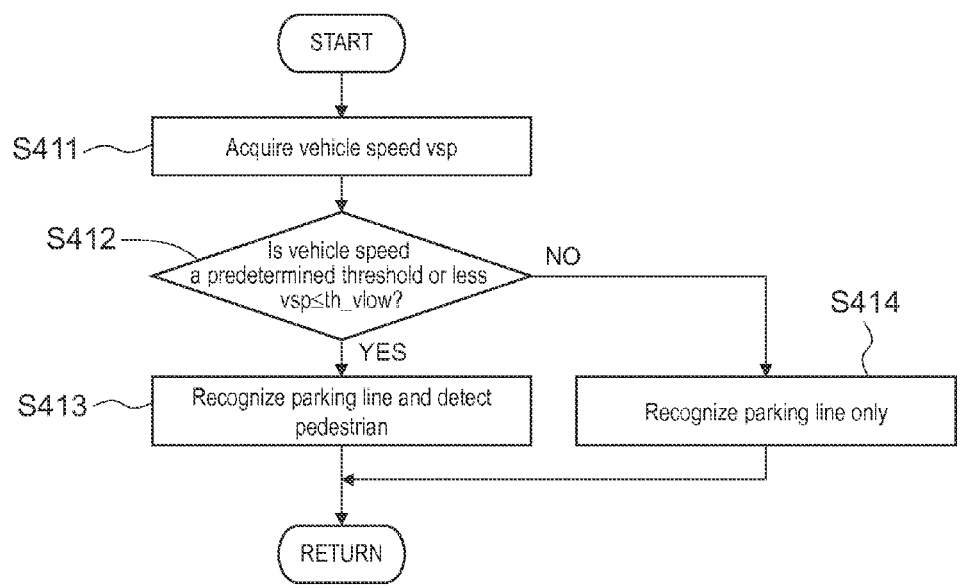
FIG. 18 is a flowchart to describe a scheduling method.

Referring next to FIGS. 17 to 19, the following describes Embodiment 4 of the present invention.

FIG. 17 is a block diagram to describe the configuration of a vehicle-mounted image processing device of Embodiment 4, FIG. 18 is a flowchart to describe a scheduling method, and FIG. 19 illustrates an exemplary use allocation rate of a CPU. The same reference numerals are assigned to elements similar to those in the above embodiments, and the detailed descriptions thereon are omitted.

The present embodiment has a feature in that a scheduling unit 18 is added to the configuration of Embodiment 3.

As illustrated in FIG. 17, the vehicle-mounted image processing device includes the scheduling unit 18 that determines whether outside recognition processing by an outside recognition unit is to be performed or not based on the vehicle speed.

As illustrated in FIG. 18, the scheduling unit 18 acquires information on vehicle speed vsp (Step S411), and determines whether the vehicle speed vsp is a predetermined threshold th_vlow or lower or not (Step S412). Then, when it is determined that the vehicle speed vsp is the predetermined threshold th_vlow or lower (YES at STEP S412), both of the parking line recognition processing and the pedestrian detection processing are performed (Step S413). On the other hand, when it is determined that the vehicle speed vsp is higher the threshold th_vlow (NO at STEP S412), the parking line recognition processing only is performed (Step S414).

The vehicle-mounted image processing device has a CPU as hardware, having a first image processing circuit made up of a chip for image processing only and a second image processing circuit made up of a general-purpose chip, for example. The scheduling unit 18 allocates a use rate to the first image processing circuit and the second image processing circuit in accordance with the vehicle-speed condition.

For instance, as illustrated in FIG. 19, when the vehicle speed vsp is a threshold th_vlow or less, both of the parking line recognition processing and the pedestrian detection processing are performed at Step S413, where use allocation is performed so that the first image processing circuit performs all (100%) of the pedestrian detection processing and the second image processing circuit performs all (100%) of the parking line recognition processing.

When the vehicle speed vsp is higher than the threshold th_vlow, the parking line recognition processing only is performed at Step S414, where use allocation is performed so that the first image processing circuit performs 50% of the parking line recognition processing and the second image processing circuit performs the remaining 50% of the parking line recognition processing.

The present embodiment can allocate different processing to each of the chips when two applications are simultaneously operated, whereby their simultaneous operation can be implemented. When only one application is operated, the two chips are used appropriately to shorten the processing cycle.

[Embodiment 5]

Referring next to FIGS. 20 to 24, the following describes Embodiment 5 of the present invention.

Figure 20:
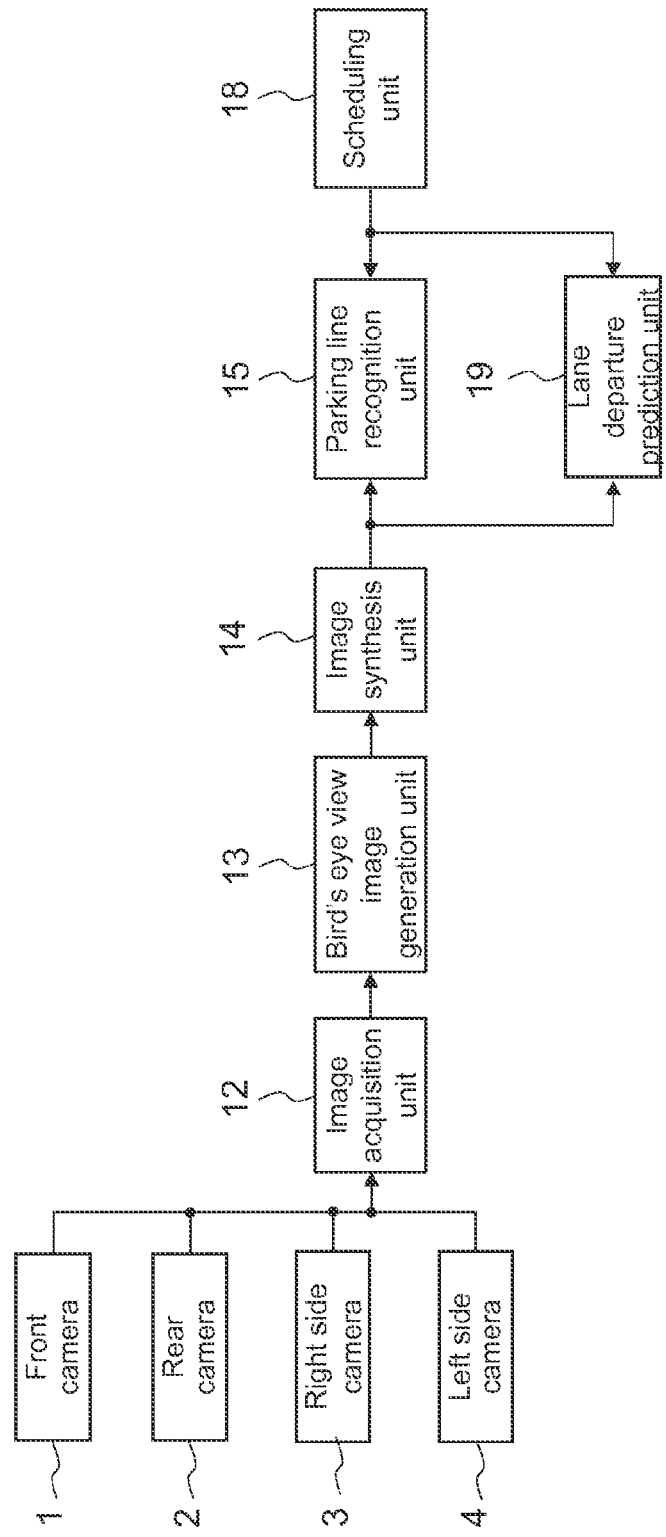
FIG. 20 is a block diagram to describe the configuration of a vehicle-mounted image processing device of Embodiment 5.
Figure 21:
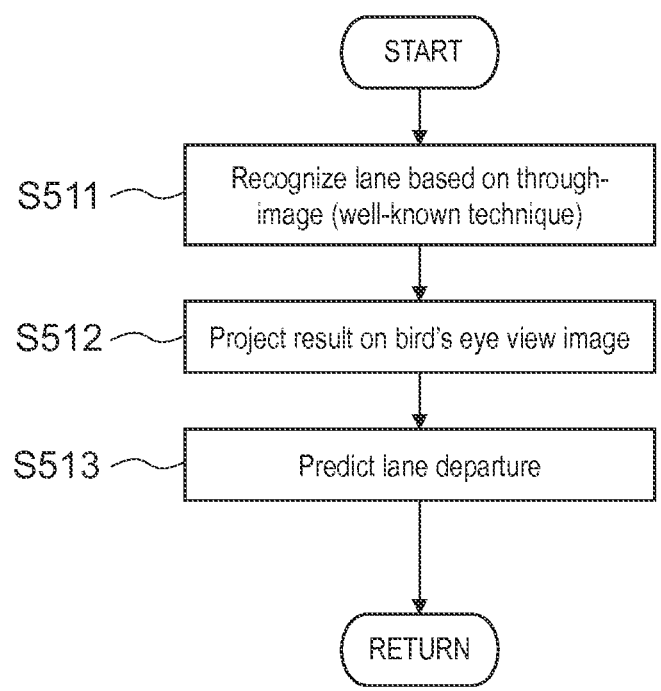
FIG. 21 is a flowchart to describe a lane departure prediction method.
Figure 22:
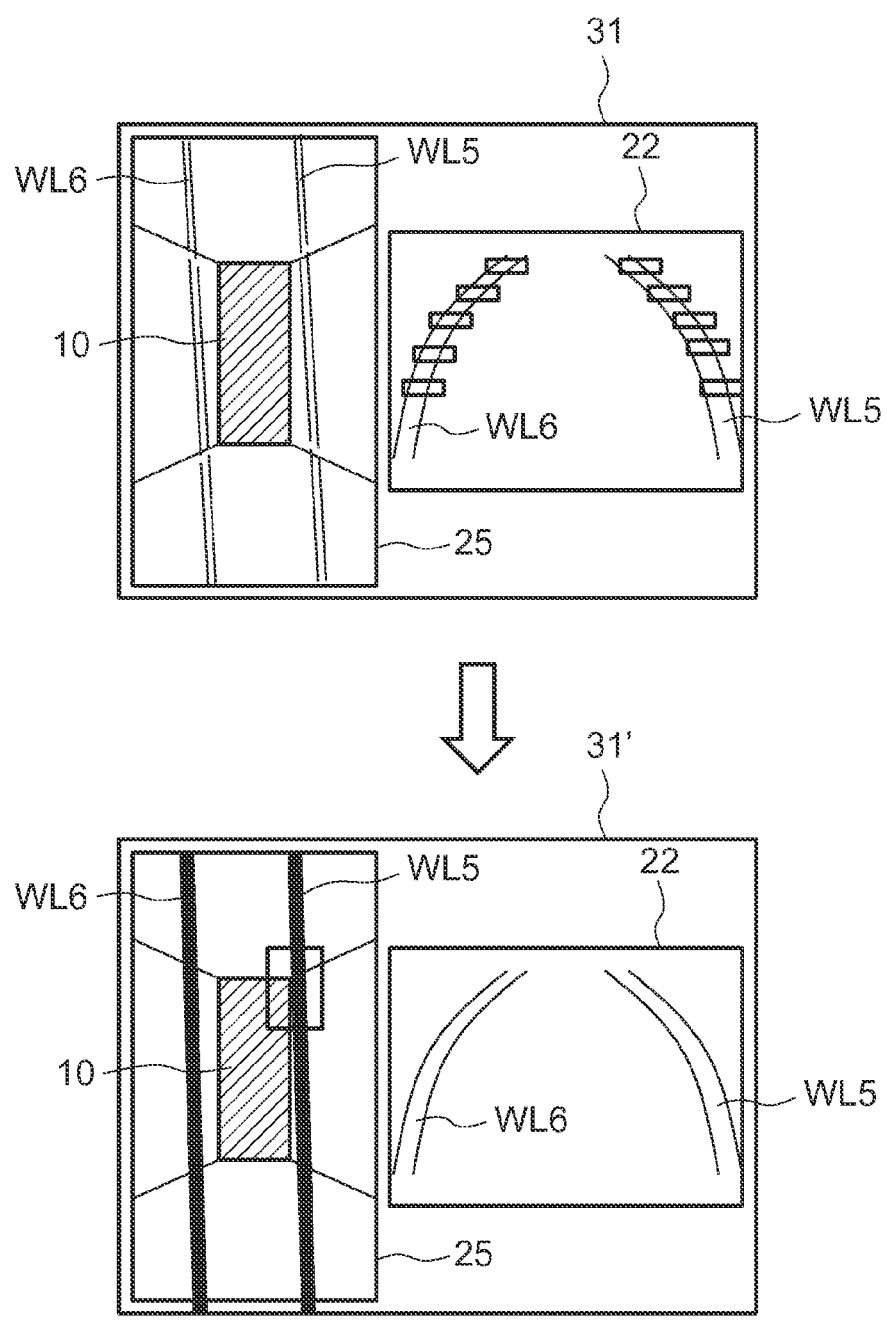
FIG. 22 illustrates an image to describe a lane departure prediction method.

FIG. 20 is a block diagram to describe the configuration of a vehicle-mounted image processing device of Embodiment 5, FIG. 21 is a flowchart to describe a lane departure prediction method, and FIG. 22 illustrates an image to describe a lane departure prediction method. The same reference numerals are assigned to elements similar to those in the above embodiments, and the detailed descriptions thereon are omitted.

The present embodiment has a feature in that a lane departure prediction unit 19 is provided instead of the pedestrian detection unit 17 of Embodiment 4.

As illustrated in FIG. 20, the vehicle-mounted image processing device includes the lane departure prediction unit 19. The lane departure prediction unit 19 performs lane departure prediction processing to predict departure of the vehicle 10 from a traveling lane during traveling.

As illustrated in FIG. 21, the lane departure prediction unit 19 recognizes a lane based on a through-image (Step S511), and projects a result thereof on a bird's eye view image (Step S512). A lane can be recognized based on a through-image by a well-known technique. Then, departure from the traveling lane of the vehicle is predicted based on the bird's eye view image (Step S513). For instance, when the vehicle 10 approaches the traveling lane during traveling to be at a preset distance, the lane departure prediction unit predicts the departure of the vehicle from the traveling lane.

As illustrated in FIG. 22, the lane recognition at Step S511 results in recognition of two traveling lanes WL5 and WL6 extending in the traveling direction of the vehicle 10 on a through-image 22 of a synthesized image 31. Then at Step S512, the traveling lanes WL5 and WL6 recognized in the through-image 22 are projected on a bird's eye view image 25 on a synthesized image 31', and at Step S513, lane departure is predicted based on the bird's eye view image 25.

The bird's eye view image 25 is easily handled in terms of image processing compared with the through-image 22. That is, lane departure can be predicted more speedily and precisely based on the bird's eye view image 25 than the through-image 22.

Figure 23:
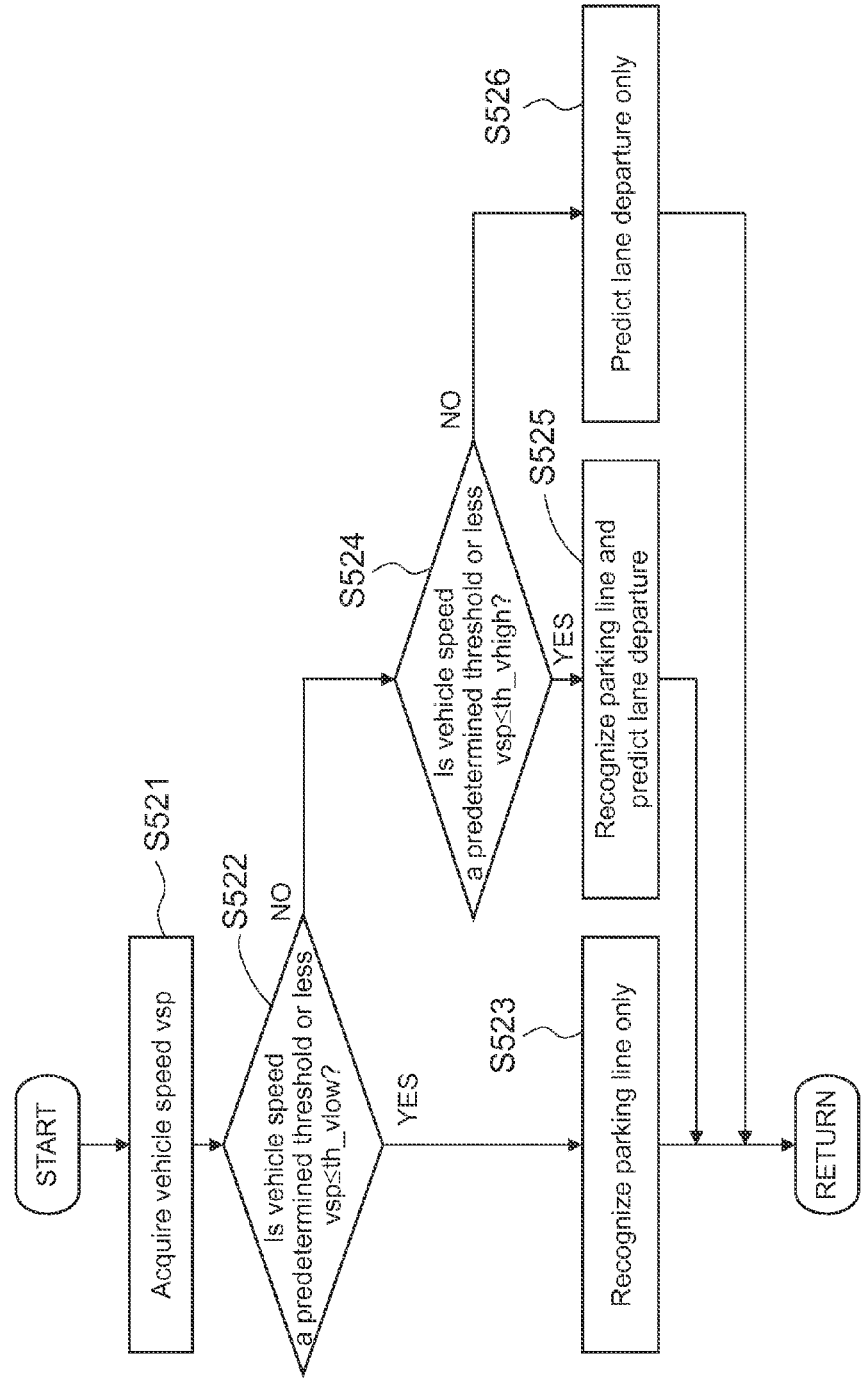
FIG. 23 is a flowchart to describe a scheduling method.

FIG. 23 is a flowchart to describe a scheduling method, and FIG. 24 illustrates an exemplary use allocation rate of a CPU.

As illustrated in FIG. 23, the scheduling unit 18 acquires information on vehicle speed vsp (Step S521), and determines whether the vehicle speed vsp is a predetermined low-speed threshold th_vlow or lower or not (Step S522). Then, when it is determined that the vehicle speed vsp is the low-speed threshold th_vlow or lower (YES at STEP S522), the parking line recognition processing only is performed (Step S523).

On the other hand, when it is determined that the vehicle speed vsp is higher than the low-speed threshold th_vlow (NO at STEP S522), determination is made whether the vehicle speed vsp is a high-speed threshold th_vhigh or lower or not (Step S524). Then when it is determined that the vehicle speed vsp is the high-speed threshold th_vhigh or less (YES at STEP S524), both of the parking line recognition processing and the lane departure prediction processing are performed (Step S525). On the other hand, when it is determined that the vehicle speed vsp is higher than the high-speed threshold th_vhigh (NO at STEP S524), the lane departure prediction processing only is performed (Step S526).

The vehicle-mounted image processing device has a CPU as hardware, having a first image processing circuit made up of a chip for image processing only and a second image processing circuit made up of a general-purpose chip, for example. The scheduling unit 18 allocates a use rate to the first image processing circuit and the second image processing circuit in accordance with the vehicle-speed condition.

For instance, as illustrated in FIG. 24, when the vehicle speed vsp is the low-speed threshold th_vlow or less, the parking line recognition processing only is performed at Step S523, where use allocation is performed so that the first image processing circuit performs 50% of the parking line recognition processing and the second image processing circuit performs the remaining 50% of the parking line recognition processing.

When the vehicle speed vsp is higher than the low-speed threshold th_vlow and is the high-speed threshold th_vhigh or less, both of the parking line recognition processing and the lane departure prediction processing are performed at Step S525, where use allocation is performed so that the first image processing circuit performs all (100%) of the parking line recognition processing and the second image processing circuit performs all (100%) of the lane departure prediction processing.

Then when the vehicle speed vsp is higher than the high-speed threshold th_vhigh, the lane departure prediction processing only is performed at Step S526, where use allocation is performed so that the first image processing circuit performs 50% of the lane departure prediction processing and the second image processing circuit performs the remaining 50% of the lane departure prediction processing.

The present embodiment can allocate different processing to each of the chips when two applications are simultaneously operated, whereby their simultaneous operation can be implemented. When only one application is operated, the two chips are used appropriately to shorten the processing cycle.

That is a detailed description on the embodiments of the present invention, and the present invention is not limited to the above-described embodiments and may include various modification examples without departing from the spirit of the present invention recited in claims. For instance, the entire detailed configuration of the embodiments described above for explanatory convenience is not always necessary for the present invention. A part of one embodiment may be replaced with the configuration of another embodiment, or the configuration of one embodiment may be added to the configuration of another embodiment. The configuration of each embodiment may additionally include another configuration, or a part of the configuration may be deleted or replaced.

REFERENCE SIGNS LIST 1 to 4 Cameras
10 Own vehicle (vehicle)
12 Image acquisition unit
13 Bird's eye view image generation unit
14 Image synthesis unit
15 Parking line recognition unit
16 Display switching request acquisition unit
17 Pedestrian detection unit
18 Scheduling unit
19 Lane departure prediction unit
21 to 24 Through-images
25 Bird's eye view image
WL Parking line
WL1 to WL3 Marking lines
WL5, WL6 Traveling lines

The invention claimed is:

1. A vehicle-mounted image processing device, comprising:
    an image acquisition unit that acquires through-images taken by cameras disposed on front, rear and sides of a vehicle;
    a bird's eye view image generation unit that converts the acquired through images to generate a bird's eye view image;
    a parking line recognition unit that performs parking line recognition processing to recognize a parking line based on one or more of the through-images and the bird's eye view image,
    wherein the parking line recognition unit performs:
        first parking line recognition processing based on the bird's eye view image to recognize a parking line in a predetermined range of the bird's eye view image, wherein the first parking line recognition processing is performed in an area surrounding the vehicle and the predetermined range is associated with the area surrounding the vehicle, and second parking line recognition processing to set and process only an image processing area of the through images that is further away from the predetermined range of the bird's eye view image, and recognize a parking line based on the image processing area of the through-images, and when a speed of the vehicle is higher than a first preset threshold, the parking line recognition unit performs both the first parking line recognition processing and the second parking line recognition processing.

2. The vehicle-mounted image processing device according to claim 1, wherein when a speed of the vehicle is the threshold or less, the parking line recognition unit performs only the first parking line recognition processing.

3. The vehicle-mounted image processing device according to claim 1, further comprising an in-vehicle monitor that can selectively display a synthesized image of the bird's eye view image and the through-images in accordance with a display switching request from a user, wherein when the parking line recognition unit performs the first parking line recognition processing and the synthesized image is selected and displayed on the in-vehicle monitor, the parking line recognition unit performs the second parking line recognition processing instead of the first parking line recognition processing.

4. The vehicle-mounted image processing device according to claim 1, further comprising:

a pedestrian detection unit that detects a pedestrian based on one or more of the through-images and the bird's eye view image; and a scheduling unit that determines whether to execute parking line recognition processing by the parking line recognition unit or pedestrian detection processing by the pedestrian detection unit in accordance with vehicle speed, wherein when the vehicle speed is a second preset threshold or less, the scheduling unit makes the parking line recognition unit perform parking line recognition processing and the pedestrian detection unit perform pedestrian detection processing, and when the vehicle speed is higher than the threshold, the scheduling unit makes the parking line recognition unit only perform parking line recognition processing.

5. The vehicle-mounted image processing device according to claim 4, further comprising: a first image processing circuit and a second image processing circuit, wherein when the vehicle speed is the threshold or less, the scheduling unit makes any one of the first image processing circuit and the second image processing circuit perform pedestrian detection processing by the pedestrian detection unit and makes the other of the first image processing circuit and the second image processing circuit perform parking line recognition processing by the parking line recognition unit, and when the vehicle speed is higher than the threshold, the scheduling unit makes the first image processing circuit perform a part of the parking line recognition processing by the parking line recognition unit and makes the second image processing circuit perform remaining of the parking line recognition processing by the parking line recognition unit.

6. The vehicle-mounted image processing device according to claim 1, further comprising:

a lane recognition unit that recognizes a vehicle traveling lane based on one or more of the through-images and the bird's eye view image; and a scheduling unit that determines whether to execute parking line recognition processing by the parking line recognition unit or lane recognition processing by the lane recognition unit in accordance with the vehicle speed, wherein when the vehicle speed is a third preset threshold or less, the scheduling unit makes the parking line recognition unit only perform parking line recognition processing, when the vehicle speed is higher than the third preset threshold and a fourth preset threshold or less, the scheduling unit makes the parking line recognition unit perform parking line recognition processing and the lane recognition unit perform lane recognition processing, and when the vehicle speed is higher than the fourth preset threshold, the scheduling unit makes the lane recognition unit only perform lane recognition processing.

7. A vehicle-mounted image processing device, comprising:

an image acquisition unit that acquires through-images taken by cameras disposed on front, rear and sides of a vehicle;

a bird's eye view image generation unit that converts the acquired through images to generate a bird's eye view image;

a parking line recognition unit that performs parking line recognition processing to recognize a parking line based on one or more of the through-images and the bird's eye view image;

a lane recognition unit that recognizes a vehicle traveling lane based on one or more of the through-images and the bird's eye view image; and a scheduling unit that determines whether to execute parking line recognition processing by the parking line recognition unit or lane recognition processing by the lane recognition unit in accordance with the vehicle speed, wherein the parking line recognition unit performs:

first parking line recognition processing based on the bird's eye view image to recognize a parking line in a predetermined range of the bird's eye view image, wherein the first parking line recognition processing is performed in an area surrounding the vehicle and the predetermined range is associated with the area surrounding the vehicle, and second parking line recognition processing to set and process only an image processing area of the through images that is further away from the predetermined range of the bird's eye view image, and recognize a parking line based on the image processing area of the through-images, and when the vehicle speed is a first preset threshold or less, the scheduling unit makes the parking line recognition unit only perform parking line recognition processing, when the vehicle speed is higher than the first threshold and a second preset threshold or less, the scheduling unit makes the parking line recognition unit perform parking line recognition processing and the lane recognition unit perform lane recognition processing, and when the vehicle speed is higher than the second preset threshold, the scheduling unit makes the lane recognition unit only perform lane recognition processing.

* * * * *